United States Patent
Goffart et al.

(10) Patent No.: US 7,641,268 B2
(45) Date of Patent: Jan. 5, 2010

(54) ASSEMBLY OF A BODYWORK PART AND A HEADLIGHT GLASS FOR A MOTOR VEHICLE

(75) Inventors: David Goffart, Lyons (FR); Lilian Garboud, Lagnieu (FR); Marc Verwaerde, Moras (FR); Pascal Barbier, Oyonnax (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 12/076,504

(22) Filed: Mar. 19, 2008

(65) Prior Publication Data

US 2008/0232126 A1 Sep. 25, 2008

(30) Foreign Application Priority Data

Mar. 20, 2007 (FR) .................................. 07 53937

(51) Int. Cl.
*B60N 99/00* (2006.01)
(52) U.S. Cl. ................................................. 296/193.11
(58) Field of Classification Search ............. 296/193.11
See application file for complete search history.

(56) References Cited

U.S. PATENT DOCUMENTS 3,998,178 A 12/1976 Dutot et al.
2004/0130186 A1* 7/2004 Andre et al. ........... 296/193.11

FOREIGN PATENT DOCUMENTS

| EP | 1 544 034 A1 | 6/2005 |
| FR | 2 488 556 A1 | 2/1982 |
| FR | 2 781 734 A1 | 2/2000 |
| FR | 2 855 800 A1 | 12/2004 |
| JP | A-11-348648 | 12/1999 |
| JP | A-2001-122015 | 5/2001 |
| JP | A-2001-243813 | 9/2001 |
| JP | A-2002-36984 | 2/2002 |
| JP | A-2006-264504 | 10/2006 |

\* cited by examiner

*Primary Examiner*—Lori L Lyjak
(74) *Attorney, Agent, or Firm*—Oliff & Berridge, PLC

(57) ABSTRACT

In an assembly of a bodywork part and a headlight glass for a motor vehicle that cooperate by elastic deformation, the headlight glass has an outline designed to be engaged in an opening in the bodywork part. The opening is defined by an outline in the bodywork part that is substantially complementary to the outline of the headlight glass. At least part of the outline of the bodywork part cooperates with the outline of the headlight glass by elastic deformation.

11 Claims, 1 Drawing Sheet

ASSEMBLY OF A BODYWORK PART AND A HEADLIGHT GLASS FOR A MOTOR VEHICLE

TECHNICAL FIELD

The present invention relates to the field of bodywork parts and headlight glasses for motor vehicles.

STATE OF THE ART

It is known that putting a bodywork part into a reference position around a headlight glass so as to obtain satisfactory clearance and a flush configuration constitutes an on-going concern for motor vehicle manufacturers.

In order to improve this positioning, document FR 2 855 800 already discloses a module that is fitted to the vehicle, the module comprising a fender, a headlight block with a glass having an outline designed to be engaged in an opening in the fender that is defined by an outline substantially complementary to the outline of the headlight glass, together with a receiver structure for receiving the headlight block. That receiver structure is designed to improve the positioning of the headlight glass relative to the fender.

Nevertheless, it continues to be difficult to achieve good positioning of the headlight glass relative to the fender, given that the dimensions of headlight glasses can vary considerably from one another, as a result of manufacturing tolerances.

PROPOSED SOLUTION

The invention seeks to provide an assembly of at least one bodywork part with a headlight glass, guaranteeing that the headlight glass is properly positioned relative to the surrounding bodywork parts.

To this end, the invention provides an assembly of a bodywork part and a headlight glass for a motor vehicle, the headlight glass having an outline designed to be engaged at least in part in an opening in the bodywork part, the opening being defined by an outline in the bodywork part that is substantially complementary, at least in part, to the outline of the headlight glass, in which assembly at least part of the outline of the bodywork part co-operates with the outline of the headlight glass by elastic deformation.

It should be observed that the outline of the headlight glass delimits the portion of the glass that is visible from the outside of the vehicle. Thus, this outline can be framed by a peripheral edge of the glass that is not visible from the outside, e.g. being designed for fastening the glass on a headlight box. Furthermore, headlight glass may be an isolated part, or else it may be formed integrally with a headlight box.

PARTICULAR ADVANTAGES

Because of the elastic deformation, the bodywork part is positioned in particularly effective manner around the headlight glass since the clearances traditionally formed between the headlight glass and a bodywork part are reduced considerably. This provides an assembly that is suitably positioned regardless of dispersions in the dimensions of headlight glasses, or indeed in bodywork parts, and not only is this done with reduced clearance, but also with clearance that is constant.

In addition, it is particularly easy to position the bodywork part around the headlight glass, thereby reducing assembly costs. The co-operation by means of elastic deformation enables the bodywork part to be merely threaded around the headlight glass without it being necessary to provide any difficult positioning operations.

PARTICULAR EMBODIMENTS

The outline of the bodywork part is preferably closed and presents a perimeter that, when isolated from the headlight glass, is shorter than or equal to the perimeter of the headlight glass. Thus, since the opening in the bodywork part is smaller than the outline of the headlight glass, it is guaranteed that co-operation will take place by elastic deformation without there being any risk of undesirable clearances being created between the headlight glass and certain portions of the bodywork part. This also ensures that the bodywork part is held securely around the headlight glass. It should be observed that when there is a gasket interposed between the bodywork part and the glass, the perimeter of the outline of the bodywork part can also be shorter than or equal to the perimeter of the gasket associated with the glass, when the gasket is mounted on the headlight glass, or else that the perimeter of the gasket associated with the bodywork part, when the gasket is mounted on the bodywork part, is shorter than or equal to the perimeter of the outline of the headlight glass.

The invention may also include one or more of the following characteristics.

The bodywork part includes an elastically deformable portion situated above the headlight glass when the bodywork part and the headlight glass are assembled together.

The assembly further includes reinforcement for the bodywork part that is fitted to a portion of the bodywork part that is distinct from its deformable portion. The reinforcement can serve for example to perform the function preventing the bodywork part from blistering, or it can act as a support for the headlight unit. Since the reinforcement needs to be stiff to some extent, the portion of the bodywork part against which it is fitted becomes relatively stiff, which is why it is preferable for the bodywork part to have no reinforcement in its deformable portion. For example, the reinforcement may extend as a U-shape around the outline of the bodywork part, thereby leaving a portion of the outline disengaged so as to enable the bodywork part to deform. The reinforcement may also be in the form of a closed rim or a rim with a small opening around the outline of the bodywork part so as to strengthen it, while defining a space relative to the outline of the bodywork part, at least in a portion of said outline, which space is in register with the deformable portion of the bodywork part.

The assembly also includes, over at least a portion of the outline of the headlight glass, an elastomer that is arranged between the bodywork part and the headlight glass, or else between the bodywork part and a headlight box on which the headlight glass is fitted. It is thus possible to flatten the gasket between the bodywork part and the headlight unit of the vehicle, thereby having the effect of accommodating dispersions in dimensions from one headlight glass to another. Consequently, the same bodywork part can be associated with a gasket that will be very highly compressed if the glass is of large dimension, and that is compressed relatively little otherwise, but in both configurations the clearance will be regular.

The elastomer presents non-uniform flattening properties along its length, so as to make the deformation of the bodywork part uniform. Certain portions of the outline of the bodywork part are liable to deform more than others, and that could give rise to different clearance along the outline of the part. Thus, in order to accommodate these differences in flexibility in the bodywork part, the elastomer may flatten to a greater extent in register with flexible zones of the bodywork part, and may be more resistant to flattening in register with zones of the bodywork part that deform little, so as to maintain constant clearance in spite of the differences in flexibility.

The elastomer is a foam of density that varies along its length.

The bodywork part includes spacer ribs in the vicinity of its outline. These serve to guarantee minimum clearance between the bodywork part and the headlight glass, in particular in zones where the elastomer runs the risk of being compressed excessively.

The bodywork part is a fender.

The outline of the bodywork part defining the opening is closed.

The elastic deformation of the bodywork part comprises stretching of the outline of the bodywork part around the glass. The deformation is thus understood as being deformation that is continuous, being distributed over a certain area and along the outline of the bodywork part. The bodywork part thus has an elastically deformable portion that preferably occupies more than 20% of the outline of the headlight glass. It should be observed that this continuous deformation differs from localized or discrete elastic deformation, such as the deformation of one or more resilient tongues made in the vicinity of the outline of the bodywork part. Furthermore, the portion of the bodywork part that is deformed elastically is preferably visible from the outside of the vehicle. Since the bodywork part is deformed by being stretched, rather than being subjected to deformation locally, the deformation is distributed along the outline and is therefore not visible to the naked eye, so there is no need for it to be performed in a portion of the bodywork part that is not visible.

The invention also applies a method of assembling a bodywork part and a headlight unit for a motor vehicle, in which the headlight glass has an outline that is designed to be engaged in an opening of the bodywork part that is defined by an outline of the bodywork part that is substantially complementary to the outline of the headlight glass, during which method, in order to assemble the headlight glass with the bodywork part, the opening in the bodywork part is enlarged.

The invention also provides a method of assembling a bodywork part with a headlight glass for a motor vehicle, in which the headlight glass has an outline that is designed to be engaged at least in part in an opening in the bodywork part that is defined by an outline in the bodywork part that is substantially complementary, at least in part, to the outline of the headlight glass, during which method, in order to assemble the headlight glass with the bodywork part, the opening in the headlight is enlarged by being deformed elastically, the opening continuing to be elastically deformed once the bodywork part and the headlight glass have been assembled together. It should be observed that this method differs from a method of assembly by snap-fastening, during which elastic deformation does no more take place once the bodywork part and the headlight glass have been assembled together.

DESCRIPTION OF THE FIGURE

The invention can be better understood on reading the following description given purely by way of example and made with reference to the sole FIG., corresponding to a diagrammatic face view of an assembly comprising a bodywork part and a headlight glass of the invention.

The FIGURE shows a bodywork part comprising a motor vehicle front fender 10 made of a plastics material, e.g. polypropylene. The FIGURE also shows a headlight glass 12 fitted on a headlight box (not shown).

Figure 1:
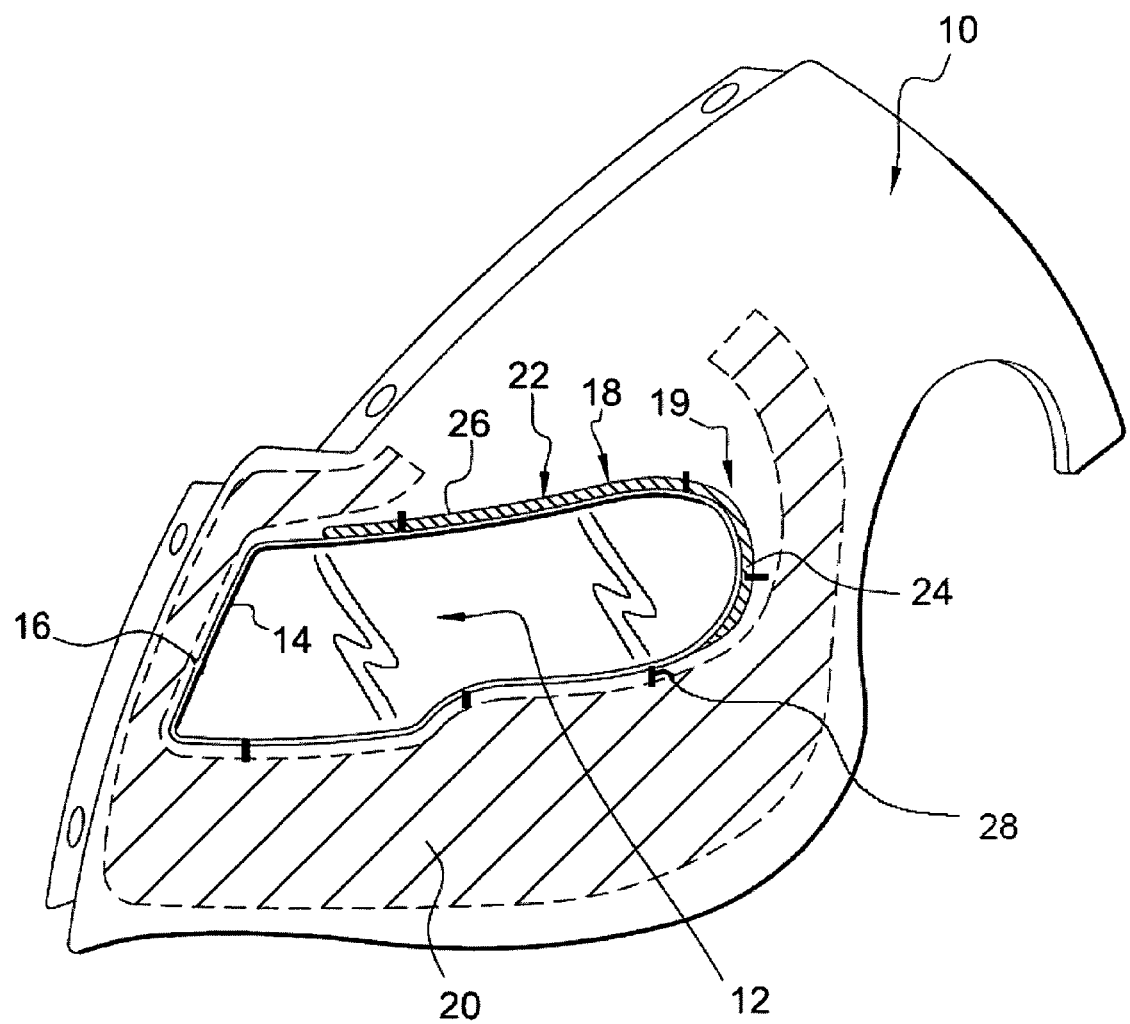

The glass 12 has an outline 14 defining the portion of the glass 12 that is visible from outside the vehicle when the assembly comprising the fender 10 and the glass 12 is mounted on the vehicle. The outline 14 is designed to be engaged in an opening in the fender 10, the opening being defined by an outline 16 in the fender that is substantially complementary to the outline 14 of the headlight glass 12.

In order to ensure that the outline 16 in the fender 10 co-operates by elastic deformation with the outline 14 of the glass 12, the perimeter of the outline 16, when the glass and the fender are isolated from each other, is shorter than the perimeter of the outline 14 of the glass 12, account being taken of the presence of a gasket, if any.

Provision is made for certain portions of the outline 16 of the fender to be more deformable than others. Thus, the portion 18 of the outline 16 of the fender, situated substantially over the glass 12 and corresponding to the most deeply cutout portion of the fender, is more deformable than the portion of the outline situated beneath the glass 12. This portion 18, referred to as the flexible or deformable zone, is made more flexible than the remainder of the outline 16 because no stiff element is applied thereto. In contrast, in the other portion of the outline 16, reinforcement 20 for the headlight block is fitted (as shown in dashed lines), such that this portion is relatively rigid and deforms very little. The reinforcement 20 which extends around the outline 16 so as to form a rim with a small opening for preventing blistering of the fender, however this rim leaves a space 19 between itself and a portion of the outline 16, this space being in register with the flexible zone 18 of the fender. Thus, the reinforcement 20 is not fitted behind the flexible zone 18 so as to leave this zone 18 free to deform. In a variant that is not shown, the reinforcement could equally well be in the form of a closed rim.

In order to make the clearance between the outlines 14 and 16 more uniform, a gasket 22 is provided between the fender 10 and the glass 12. In the FIGURE, the gasket is provided only in register with the flexible zone 18 of the fender, however it could be provided all along the outline 16 in the fender. This gasket may present differing deformation properties, for example it may be made of foam having lower density in a portion 24 than in a portion 26. Provision can thus be made for the portion 24 of the gasket that is situated in the most-deeply cut-out zone of the fender, corresponding to a zone of the fender that is particularly flexible, flattens more easily than the portion 26 of the gasket that is situated in a zone of the fender that is somewhat less deformable, so that the clearance is kept constant regardless of the flexibility of the portions of the fender.

On its inside wall, the fender also includes spacing ribs 28, in the vicinity of its outline 16.

Because of the deformable portion 18 of the fender 10, it is possible to assemble the headlight glass 12 with the fender by enlarging the opening in the fender 10, i.e. by lengthening the perimeter of the outline 16. The outline 16 of the fender and the outline 14 of the headlight glass thus co-operate, at least in the vicinity of the flexible zone 18, by elastic deformation. This guarantees minimum and constant clearance between these two outlines. It will be understood that not only does deformation occur during the assembly procedure, but that deformation also remains after the bodywork part and the glass have been assembled together, i.e. the opening is held in a deformed condition once the part and the glass are in position. In other words, the perimeter of the outline of the opening, once the part and the glass have been positioned relative to each other, is longer than the perimeter that the outline had before the part and the glass were assembled together.

It should be observed that the flexible zone 18 in this example is visible from outside the vehicle. It occupies an extent of more than 20% of the perimeter of the headlight glass 12. This flexible zone deforms continuously along the glass 12 so as to enable the fender to be stretched around the glass. Because it is visible to the outside, and also because it deforms in continuous manner, this flexible zone 12 differs from a resilient tongue made on an inside edge of the fender.

Finally, it should be observed that the invention is not limited to the embodiment described above. The FIGURE shows a closed outline 16 in the fender. Nevertheless, this outline could be open, with the opening in which the headlight glass 12 is engaged being defined by the fender 10 in co-operation with some other bodywork part or reinforcement fastened to the bodywork part.

Amongst the advantages of the invention, it will be understood that elastic deformation continues to be present once the bodywork part and the headlight glass have been finally positioned relative to each other on the vehicle, thereby ensuring minimum and constant clearance between these two elements in their final position. It will be understood that such an assembly of the bodywork part and the headlight glass differs from an assembly by snap-fastening.

The invention claimed is:

1. An assembly of a bodywork part and a headlight glass for a motor vehicle, wherein the bodywork part has an opening and is positioned around the headlight glass, the headlight glass has an outline engaged at least in part in the opening in the bodywork part, the opening being defined by an outline in the bodywork part that is substantially complementary, at least in part, to the outline of the headlight glass, and at least part of the outline of the bodywork part is elastically deformed to be complementary with the outline of the headlight glass.

2. An assembly according to claim 1, in which the outline of the bodywork part is closed and presents a perimeter that, when the bodywork part is isolated from the headlight glass, is shorter than or equal to the perimeter of the outline of the headlight glass.

3. An assembly according to claim 1, in which the bodywork part includes an elastically deformable portion situated over the headlight glass when the bodywork part and the headlight glass are assembled together.

4. An assembly according to claim 2, in which the bodywork part includes an elastically deformable portion, the assembly further including reinforcement for the bodywork part, the reinforcement being fitted to a portion of the bodywork part that is distinct from the elastically deformable portion.

5. An assembly according to claim 1, further comprising a headlight unit, in which the headlight glass is fitted, and an elastomer arranged between the bodywork part and the headlight glass, or between the bodywork part and the headlight unit.

6. An assembly according to claim 5, in which the elastomer presents non-uniform flattening properties along its length.

7. An assembly according to claim 6, in which the elastomer is a foam of density that varies along its length.

8. An assembly according to claim 1, in which the bodywork part includes spacer ribs in the vicinity of its outline.

9. An assembly according to claim 1, in which the bodywork part is a fender.

10. An assembly according to claim 1, in which the elastic deformation of the bodywork part comprises stretching the outline of the bodywork part around the headlight glass.

11. A method of assembling a bodywork part and a headlight glass for a motor vehicle, in which method the headlight glass has an outline for engaging at least in part in an opening in the bodywork part that is defined by an outline in the bodywork part that is substantially complementary, at least in part, to the outline of the headlight glass, during which method, in order to assemble the headlight glass with the bodywork part, the opening in the bodywork part is enlarged by being deformed elastically, the opening continuing to be elastically deformed once the bodywork part and the headlight glass have been assembled together.

* * * * *